United States Patent
Hassan (10) Patent No.: US 9,049,582 B1
(45) Date of Patent: Jun. 2, 2015

(54) METHOD AND APPARATUS TO MONITOR POWER MANAGEMENT EFFICIENCY

(75) Inventor: Kafi I. Hassan, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 451 days.

(21) Appl. No.: 13/185,962

(22) Filed: Jul. 19, 2011

(51) Int. Cl.
G08C 17/00 (2006.01)
H04W 4/20 (2009.01)
H04W 52/02 (2009.01)

(52) U.S. Cl.
CPC ............ *H04W 4/20* (2013.01); *H04W 52/0261* (2013.01)

(58) Field of Classification Search
CPC . H04W 52/00; H04W 52/0261; H04W 28/12; H04W 40/10; H04W 4/20; H04W 52/02; H04W 52/0235; H04L 49/252; H04L 47/14
USPC ...................................... 370/255, 311, 395.31
See application file for complete search history.

(56) References Cited

U.S. PATENT DOCUMENTS

| 5,842,027 | A * | 11/1998 | Oprescu et al. | 713/300 |
| 6,813,247 | B1 * | 11/2004 | Hassan | 370/252 |
| 2002/0128051 | A1 * | 9/2002 | Liebenow | 455/574 |
| 2004/0066171 | A1 * | 4/2004 | Mori | 320/132 |
| 2006/0056370 | A1 * | 3/2006 | Hancock et al. | 370/338 |
| 2008/0101260 | A1 * | 5/2008 | Maruyama | 370/255 |
| 2009/0251300 | A1 * | 10/2009 | Yasuda et al. | 340/426.1 |
| 2011/0301890 | A1 * | 12/2011 | Shirriff et al. | 702/63 |

* cited by examiner

*Primary Examiner* — Redentor Pasia
*Assistant Examiner* — Salvador E Rivas (57) ABSTRACT

A method and apparatus to manage a communication device are disclosed. The method includes receiving a first message comprising a first battery charge level of the communication device and a first time associated with the first battery charge level, storing a first database entry comprising information comprised in the first message, in a battery charge database, determining based on data from the battery charge database, or retrieving from a power management database, a power management efficiency factor of the communication device, determining an expected operational time of the communication device based on the first message and the power management efficiency factor, and transmitting an indication that the battery charge level is low when the determined operational time remaining meets an expected operational time criteria, to the communication device.

14 Claims, 5 Drawing Sheets

METHOD AND APPARATUS TO MONITOR POWER MANAGEMENT EFFICIENCY

TECHNICAL BACKGROUND

Wireless communication systems have become an important means by which many people worldwide have come to communicate. A wireless communication system may provide communication for a plurality of wireless devices, each of which may be serviced through one or more access nodes of the communication system.

Nowadays, many wireless devices are designed to perform tasks beyond voice communications, such as internet browsing, calendar applications, email applications, navigation applications, and even user-generated applications. To perform these and other tasks, wireless devices require increased processing power and the capability to communicate wirelessly at increasingly higher rates. Increased processing power and increased wireless data rates generally increases power consumption of limited battery power.

Furthermore, some of the tasks that may be performed by the wireless device may consume more or less power than the others. Accordingly, a rate of power consumption of a device would vary depending on which of these tasks the wireless device is currently executing, and a conventional visual indicator may not provide the user an accurate measure of how much battery life remains in the device's battery (i.e., how much time remains before the battery can no longer support the device's operation).

OVERVIEW

A method to manage a communication device is disclosed. The method includes receiving, by an element of a communication system, a first message comprising a first battery charge level of the communication device and a first time associated with the first battery charge level, storing, by the element, a first database entry comprising information comprised in the first message, in a battery charge database, retrieving, by the element, a power management efficiency factor of the communication device from a power management database, determining, by the element, an expected operational time of the communication device based on the first message and the power management efficiency factor, and transmitting, by the element, a message comprising an indication that the battery charge level is low when the determined operational time remaining meets an expected operational time criteria, to the communication device.

The first message may further include a first mode associated with the first battery charge level and the first time, the mode including one of device on, device idle, voice call, data call, device charging, executing a software application, and executing a specific software application. Furthermore, the power management efficiency factor may be based on the communication device and the first mode.

A method to manage a communication device is disclosed. The method includes retrieving, by an element of a communication system, at least one database entry associated with the communication device from a battery charge database, when a number of database entries of the at least one database entry meets a predetermined criteria, wherein a database entry comprises a battery charge level of the communication device and a time associated with the battery charge level, determining, by the element of the communication system, a power efficiency factor of the communication device based on the at least one database entry, and storing the power efficiency factor in a power management database, when the number of database entries of the at least one database entry meets the predetermined criteria, and retrieving, by the element of the communication system, a power efficiency factor of the communication device based on the type of the communication device from a communication device database, and storing the power efficiency factor in the power management database, when the number of database entries of the at least one database entry does not meet the predetermined criteria.

An element of a communication system configured to manage a communication device is disclosed. The element includes a communication interface to communicate with a communication device subscribed to the communication system, a database interface to communicate with a power management database and a power management database; a memory, and a processor coupled to the communication interface, the database interface, and the memory.

The processor is configured to control the element of the communication system to receive a first message comprising a first battery charge level of the communication device and a first time associated with the first battery charge level, store a first database entry comprising information comprised in the first message, in the battery charge database, retrieve a power management efficiency factor of the communication device from the power management database, determine an expected operational time of the communication device based on the first message and the power management efficiency factor, and transmit a message comprising an indication that the battery charge level is low when the determined operational time remaining meets an expected operational time criteria, to the communication device.

The first message may further include a first mode associated with the first battery charge level and the first time, the mode including one of device on, device idle, voice call, data call, device charging, executing a software application, and executing a specific software application. Furthermore, the power management efficiency factor may be based on the communication device and the first mode.

DETAILED DESCRIPTION

The following detailed description of exemplary embodiments and accompanying drawings set forth the best mode of the present teachings. For the purpose of teaching inventive principles, some aspects of the best mode may be simplified or omitted where they would be known to those of ordinary skill in the art. Other embodiments will be apparent to those skilled in the art from consideration of the specification and practice of the present teachings. Therefore, the present teachings are not limited to the specific examples described below, but only by the appended claims and their equivalents.

Figure 1:
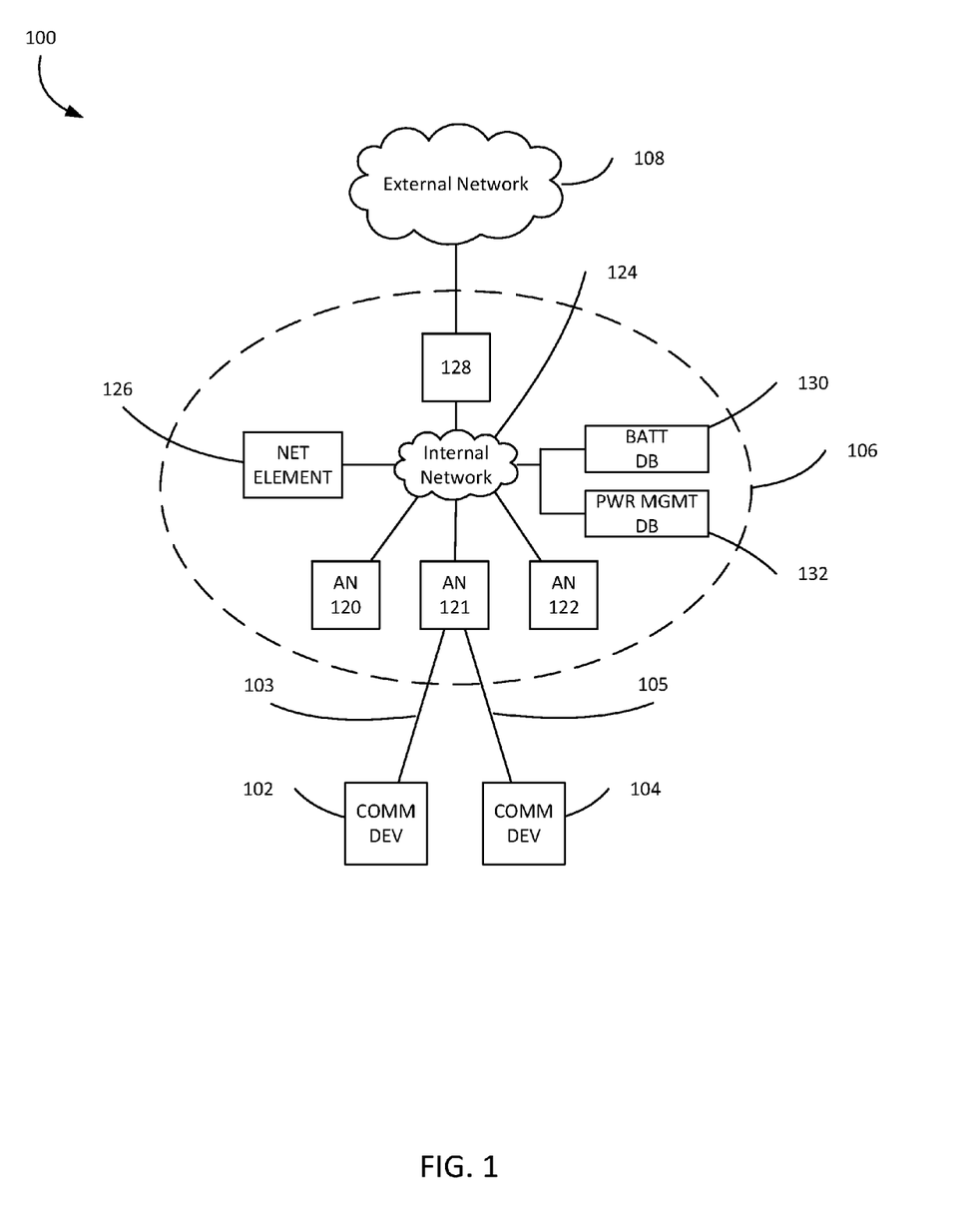
FIG. 1 includes a schematic diagram of an exemplary embodiment of the present teachings.

FIG. 1 illustrates communication environment 100 depicting certain aspects of the present teachings. Communication environment 100 comprises communication devices 102 and 104, communication system 106, and external network 108. Communication system 106 comprises access nodes 120-122, access network 124, network element 126, network gateway 128, battery charge database 130, and power management database 132.

Communication system 106 provides wireless communication services to communication devices 102 and 104, and may be implemented using one or more wireless communication protocols, such as integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format. Communication system 106 may provide half-duplex voice service, full-duplex voice service, and/or circuit switch/packet data service to communication devices 102 and 104.

Communication devices 102 and 104 may include any electronic device that may be used for voice and/or data communication over a wireless communication system. Examples of communication devices 102 and 104 include, but are not limited to, cellular phones, smart phones, personal digital assistants (PDAs), handheld devices, wireless modems, laptop computers, and personal computers. Communication devices 102 and 104 may communicate with access node 106 over wireless links 103 and 105, respectively. Wireless links 103 and 105 may use the air or space as their transport media and may carry data using various protocols, such as iDEN, CDMA, EVDO, WiMAX, GSM, LTE, WIFI, HSPA, or some other wireless communication format. Communication devices 102 and 104 may be subscribers of communication system 106 or may be subscribers of another communication system (not shown) and capable of roaming into (and being served by) communication system 106.

An access node of access nodes 120-122 may include an access node radio and control equipment contained in a base transceiver station (BTS), or cell site. However, an access node according to the present teachings is not so limited and may be configured differently. Although, for simplicity, communication system 106 is shown as including three access nodes (120-122), those of ordinary skill in the art will appreciate that communication system 106 may include more or less access nodes.

An access node of access nodes 120-122 may be used to provide a link between communication system 106 and communication devices 102 and 104, and may further provide connectivity between communication devices 102 and 104 and external network 108. The external network 108 may be the Internet, a wide area network (WAN), a local area network (LAN), an intranet, another carrier network, or some other type of communications network.

Connectivity between elements of communication system 106 is depicted for simplicity in the form of internal network 124, but the present teachings are not so limited, and communication between elements of communication system 106 may include direct links or intermediate networks, systems, or devices. Connectivity between the elements of communication system 106 may include links comprising metal, glass, air, space, or some other material as the transport media and communication therein may be realized through communication protocols such as Internet Protocol (IP), Ethernet, or some other communication format—including combinations thereof. Internal network 124 may comprise a router, a computer system, or any other element capable of being configured to interconnect multiple devices.

Network element 126 provides functionality to determine an expected operational time of at least one of communication devices 102 and 104 based on battery charge information received from a corresponding communication device, battery charge information related to the corresponding communication device stored at a battery charge database 130, and/or power management efficiency information corresponding to the corresponding device stored at a power management database 132. Although Network element 126 is illustrated as a stand-alone element, its functionality may be integrated in one or more other elements of communication system 106.

Network gateway 128 may be any element which provides a gateway between the internal network 124 and an external network 108. Network gateway 128 may aggregate subscriber and control traffic from access nodes within a communication system, provide subscriber management functions, perform network optimization, and forward subscriber traffic as necessary. In an exemplary embodiment, a network gateway 128 may be realized by an access service network (ASN) gateway of a WiMAX-based communication system, but the present teachings are not so limited.

Battery charge database 130 is a database for storing measurements, either actual or estimated, of the battery charge level of communication devices 102 and 104. Power management database 132 is a database for storing power management efficiency factors, either actual or estimated, of communication devices 102 and 104. A detailed description of the battery charge level and power management efficiency factor stored in battery charge database 130 and the power management database 132, respectively, will be provided below. Although battery charge database 130 and power management database 132 are illustrated as stand-alone elements within communication system 106, their functionality may be integrated in one storage unit or in one or more other elements of communication system 106. Furthermore, battery charge database 130 and power management database 132 may be located outside communication system 106 and accessed through external network 108.

As will be further described below with respect to exemplary embodiments, the present teachings relate to a communication system (e.g., 106) in which a network element (e.g., 126) serving a communication device (e.g, 102) receives battery charge level information from the communication device and, based on the power management efficiency of the communication device and a pre-determined criteria, determines whether the current battery charge level of the communication device is too low to operate for a pre-determined period of time. This allows the communication system to, for example, support subscribing communication devices by providing timely and accurate power management-related notifications.

Figure 2:
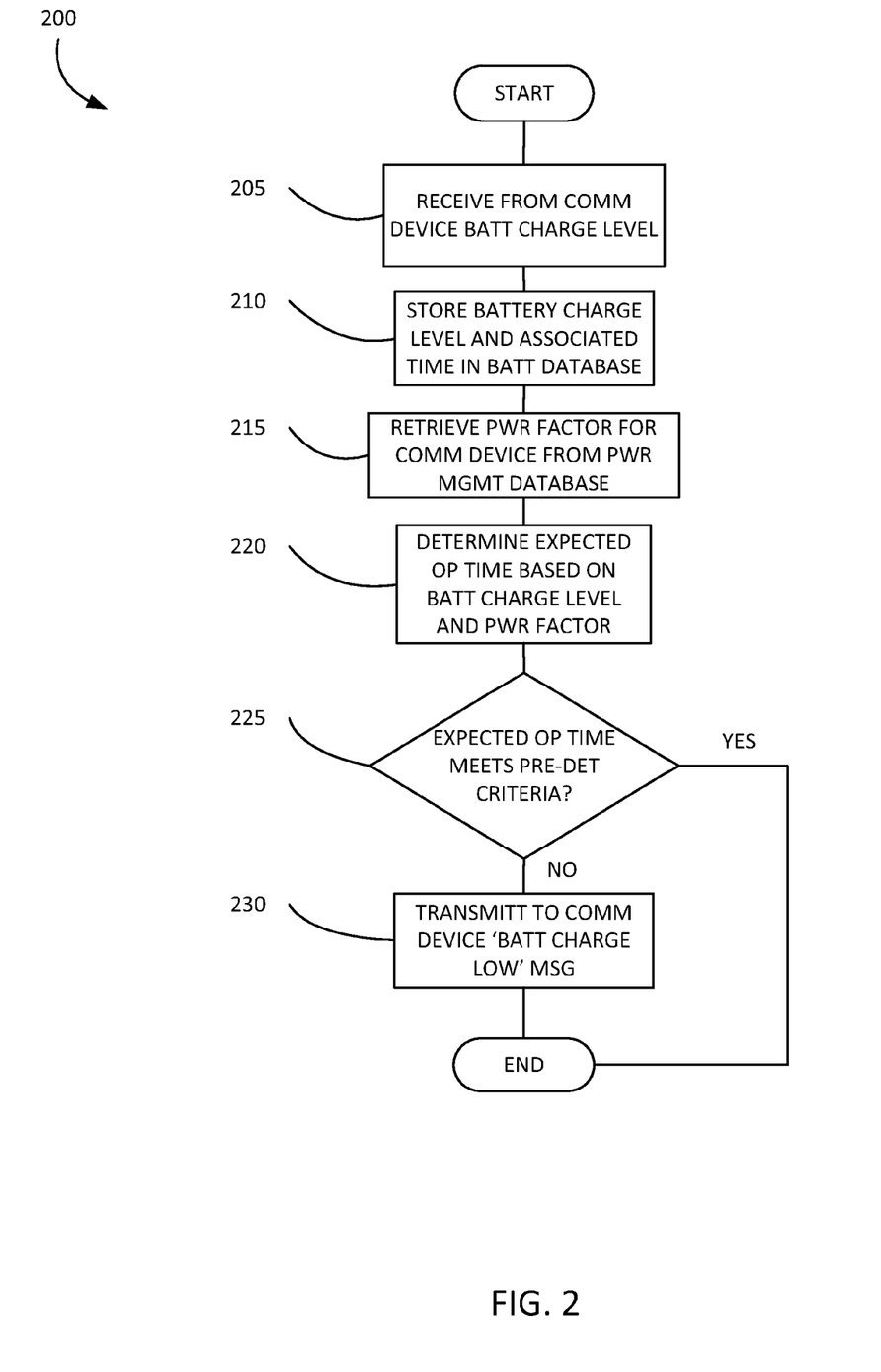
FIG. 2 includes a flowchart illustrating a process of an exemplary embodiment of the present teachings.

FIG. 2 illustrates a process 200 according to an exemplary embodiment for operating communication system 100. At step 205 network element 126 receives from communication device 102 a message including a current battery charge level of the communication device. The message may further include a time associated with the battery charge level, or network element 126 may associate the time at which the message is received with the received battery charge level. The battery charge level includes an indication of how much power is left in the battery of the communication device. In the present embodiment the battery charge level comprises a percentage of the maximum capacity of the battery remaining in the communication device battery, but the present teachings are not so limited, and may comprise any other format in which such information may be provided.

At step 210 network element 126 stores the received battery charge level and the associated time in battery charge database 130. The database entry is further associated with communication device 102. At step 215 network element 126 retrieves a power management efficiency factor associated with communication device 102 from power management database 132. In the present embodiment, the power management efficiency factor represents a measure of the power efficiency of communication device 102. Determination of the power management efficiency factor may be based on, for example, actual measurements from communication device 102, or an average calculated based on similar devices served by communication network 106, or on default/factory provided measurements for the particular communication device 102 and its battery, as will be explained in further detail below.

At step 220 network element 126 determines an expected operational time of communication device 102 based on the received battery charge level and the retrieved power management efficiency factor. In the present embodiment, the power management efficiency factor is measured in units of time/battery charge level, but the present teachings are not so limited, and the factor may be measured in some other units, such as a comparison of communication device 102 with an optimum communication device operating with an optimum battery.

As previously noted, in the present embodiment the battery charge level comprises a percentage of the maximum capacity of the battery remaining in the communication device battery. Accordingly, to determine how much time communication device 102 is expected to operate, the received battery charge level of communication device 102 may be multiplied by the corresponding power management efficiency factor. The resulting product is the expected operational time of communication device 102. A person of ordinary skill in the art would appreciate that a determination of an expected operational time depends on how the battery charge level of the subject communication device and the power management efficiency factor are measured.

At step 225 network element 126 determines if the expected operational time of communication device 102 meets a pre-determined criteria. In the present embodiment, the criteria comprises a time which may be set by the user or by the network operator. When the expected operation time meets the pre-determined criteria (i.e., the expected operational time is more than the pre-determined time), process 200 ends. When the expected operation time does not meet the pre-determined criteria (i.e., the expected operational time is less than the pre-determined time), network element 126 sends a message to communication device 102 indicating that the current battery charge level is low (step 230).

In the present embodiment, a network element within a communication system serving a communication device receives battery charge level information from the communication device and, based on the power management efficiency of the communication device and a pre-determined criteria, determines whether the current battery charge level of the communication device is too low to operate for a pre-determined period of time. The present embodiment allows the communication system to support subscribing communication devices by providing timely and accurate power management notifications.

Figure 3:
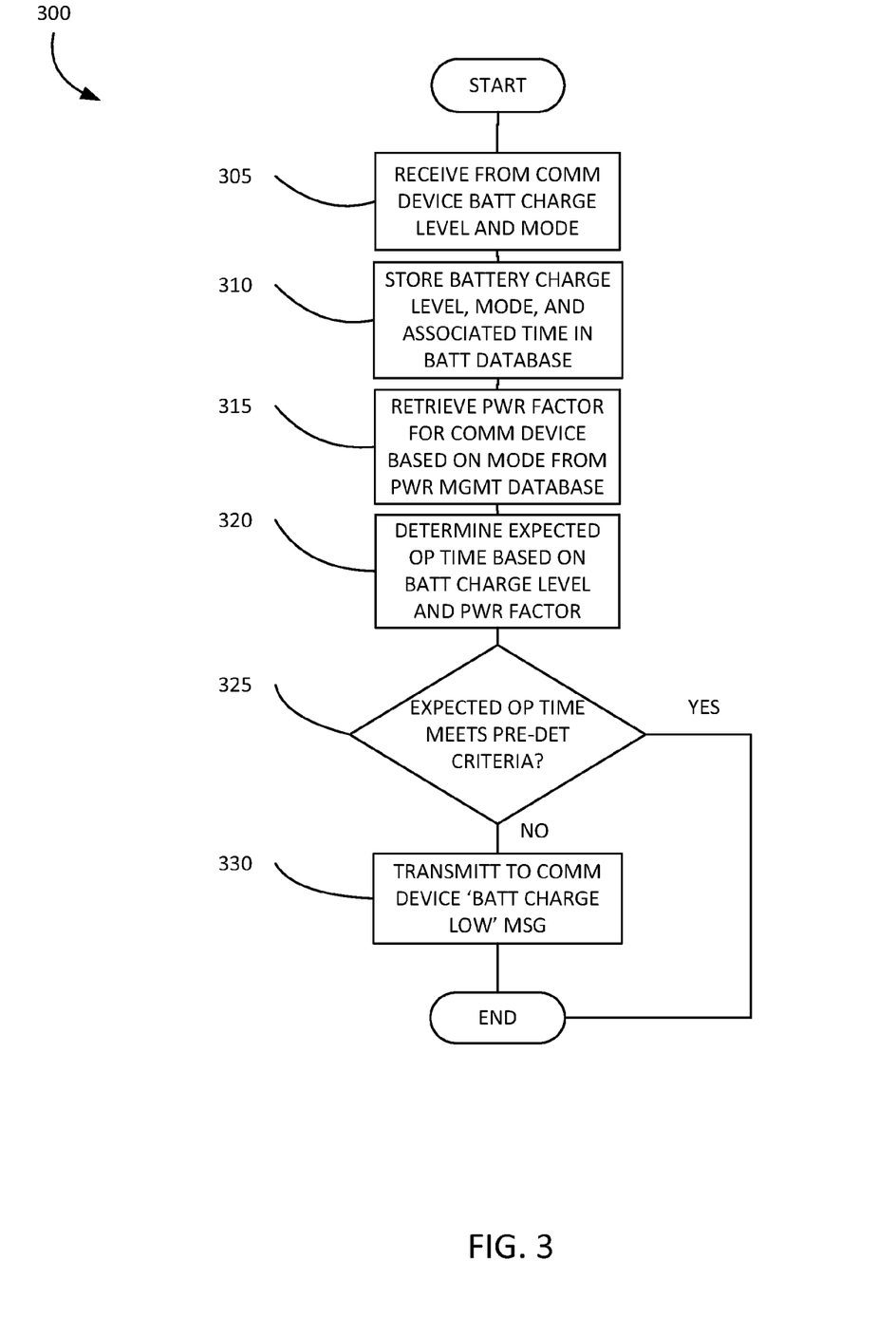
FIG. 3 includes a flowchart illustrating a process of another exemplary embodiment of the present teachings.

FIG. 3 illustrates a process 300 according to another exemplary embodiment for operating communication system 100. At step 305 network element 126 receives from communication device 102 a message including a current battery charge level of the communication device and a mode. The mode comprises an indication of the mode of operation of communication device 102. In the present embodiment, transmission of the message by communication device 102, and thus, reception by network element 126, is caused by communication device entering the indicated mode of operation, however, the present teachings are not so limited, and communication device 102 may be configured to periodically transmit to network element 126 a message including a current battery charge level of the communication device and a mode or to transmit such message upon request by communication element 126.

The message may further include a time associated with the battery charge level, or network element 126 may associate the time at which the message is received with the received battery charge level. The battery charge level includes an indication of how much power is left in the battery of the communication device. In the present embodiment the battery charge level comprises a percentage of the maximum capacity of the battery remaining in the communication device battery, but the present teachings are not so limited, and may comprise any other format in which such information may be provided.

At step 310 network element 126 stores the received battery charge level and the associated time in battery charge database 130. The database entry is further associated with communication device 102 and with the received mode. At step 315 network element 126 retrieves a power management efficiency factor associated with communication device 102 and with the received mode from power management database 132.

In the present embodiment, the power management efficiency factor represents a measure of the power efficiency of communication device 102 when operating under the received mode. For example, and not as limitation, communication device 102 may consume less battery power while on idle mode or while on a voice call than while on a packet data session. Accordingly, for each of those modes of operation, the power management efficiency factor may be different, and thus, needs to be associated in the database, and used for determination of an expected operational time, according to the corresponding mode. Determination of the power management efficiency factor may be based on, for example, actual measurements from communication device 102, on an average calculated based on similar devices served by communication network 106, or on default/factory provided measurements for the particular communication device 102 and its battery, as will be explained in further detail below.

At step 320 network element 126 determines an expected operational time of communication device 102 based on the received battery charge level and the retrieved power management efficiency factor. In the present embodiment, the power management efficiency factor is measured in units of time/battery charge level, but the present teachings are not so limited, and the factor may be measured in some other units, such as a comparison of communication device 102 with an optimum communication device operating with an optimum battery.

As previously noted, in the present embodiment the battery charge level comprises a percentage of the maximum capacity of the battery remaining in the communication device battery. Accordingly, to determine how much time communication device 102 is expected to operate, the received battery charge level of communication device 102 may be multiplied by the corresponding power management efficiency factor. The resulting product is the expected operational time of communication device 102. A person of ordinary skill in the art would appreciate that a determination of an expected operational time depends on how the battery charge level of the subject communication device and the power management efficiency factor are measured.

At step 325 network element 126 determines if the expected operational time of communication device 102 meets a pre-determined criteria. In the present embodiment, the criteria comprises a time which may be set by the user or by the network operator. When the expected operation time meets the pre-determined criteria (i.e., the expected operational time is more than the pre-determined time), process 300 ends. When the expected operation time does not meet the pre-determined criteria (i.e., the expected operational time is less than the pre-determined time), network element 126 sends a message to communication device 102 indicating that the current battery charge level is low (step 330).

In the present embodiment, a network element within a communication system serving a communication device receives battery charge level information and the current mode of operation from the communication device and, based on the power management efficiency of the communication device associated with the received mode of operation and a pre-determined criteria, determines whether the current battery charge level of the communication device is too low to operate for a pre-determined period of time. The present embodiment allows the communication system to support subscribing communication devices by providing timely and accurate power management notifications.

Figure 4:
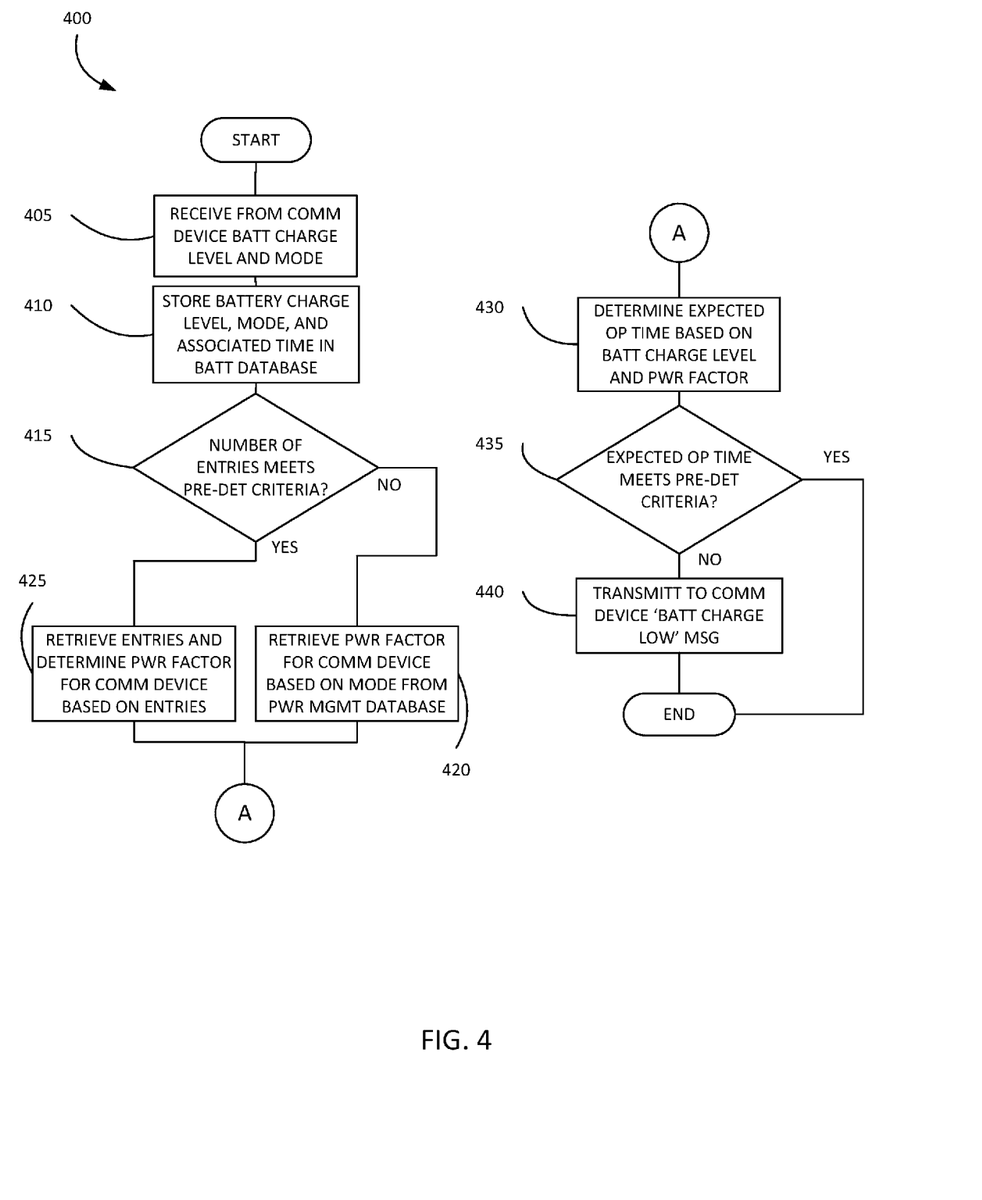
FIG. 4 includes a flowchart illustrating a process of yet another exemplary embodiment of the present teachings.

FIG. 4 illustrates a process 400 according to yet another exemplary embodiment for operating communication system 100. At step 405 network element 126 receives from communication device 102 a message including a current battery charge level of the communication device and a mode. The mode comprises an indication of the mode of operation of communication device 102. In the present embodiment, transmission of the message by communication device 102, and thus, reception by network element 126, is caused by communication device entering the indicated mode of operation, however, the present teachings are not so limited, and communication device 102 may be configured to periodically transmit to network element 126 a message including a current battery charge level of the communication device and a mode or to transmit such message upon request by communication element 126.

The message may further include a time associated with the battery charge level, or network element 126 may associate the time at which the message is received with the received battery charge level. The battery charge level includes an indication of how much power is left in the battery of the communication device. In the present embodiment the battery charge level comprises a percentage of the maximum capacity of the battery remaining in the communication device battery, but the present teachings are not so limited, and may comprise any other format in which such information may be provided.

At step 410 network element 126 stores the received battery charge level and the associated time in battery charge database 130. The database entry is further associated with communication device 102 and with the received mode.

At step 415 network element 126 determines whether battery charge database 130 includes sufficient entries to determine a power management efficiency factor based on such entries. When there are no sufficient entries to determine a power management efficiency factor, network element 126 retrieves a power management efficiency factor for communication device 102 associated with the received mode from power management database 132 (step 420). When there are sufficient entries to determine a power management efficiency factor, network element 126 retrieves such entries and determines a power management efficiency factor for communication device 102 based on the entries (step 425).

In the present embodiment, the power management efficiency factor represents a measure of the power efficiency of communication device 102 when operating under the received mode. For example, and not as limitation, communication device 102 may consume less battery power while on idle mode or while on a voice call than while on a packet data session. Accordingly, for each of those modes of operation, the power management efficiency factor may be different, and thus, needs to be associated in the database, and used for determination of an expected operational time, according to the corresponding mode. Determination of the power management efficiency factor may be based on, for example, actual measurements from communication device 102, on an average calculated based on similar devices served by communication network 106, or on default/factory provided measurements for the particular communication device 102 and its battery, without departing from the principles of the present teachings.

As previously noted, when there are no sufficient entries to determine a power management efficiency factor, network element 126 retrieves a power management efficiency factor for communication device 102 associated with the received mode from power management database 132 (step 420). For example, and not as limitation, this retrieved power management efficiency factor may be based on default/factory provided measurements for the particular communication device 102 and its battery. Although not determined based on actual data from communication device 102, this retrieved power management efficiency factor may be appropriate for most scenarios, particularly, if communication device 102 and/or its battery are relatively new.

As a further example, and not as limitation, this retrieved power management efficiency factor may be based on an average calculated based on similar devices under the same mode currently subscribed with communication network 106. For example, and not as limitation, the battery charge database may include battery charge level information of multiple devices similar to communication device 102 when starting and ending a specific software application. Based on these battery charge levels, network element 126 may determine via linear or regression analysis, for example, an average battery efficiency factor of devices similar to communication device 102 when in executing the specific software application. Therefore, when the received mode is execution of the specific software application, network element 126 may determine an estimate power management efficiency factor for communication device 102, even when communication device 102 has not executed the specific software application previously.

When there are sufficient entries to determine a power management efficiency factor, network element 126 retrieves such entries and determines a power management efficiency factor for communication device 102 based on the entries (step 425). For example, and not as limitation, the battery charge database may include entries associated with at least one instance in which the device provided a battery charge level when entering idle mode and a battery charge level when the device exited idle mode. Based on these battery charge levels, network element 126 may determine via linear analysis, for example, the battery efficiency factor of communication device 102 when in idle mode. Therefore, when the received mode is idle mode, network element 126 may determine with particularity the power management efficiency factor for communication device 102.

At step 430 network element 126 determines an expected operational time of communication device 102 based on the received battery charge level and the power management efficiency factor (either retrieved or determined).

In the present embodiment, the power management efficiency factor is measured in units of time/battery charge level, but the present teachings are not so limited, and the factor may be measured in some other units, such as a comparison of communication device 102 with an optimum communication device operating with an optimum battery. As previously noted, in the present embodiment the battery charge level comprises a percentage of the maximum capacity of the battery remaining in the communication device battery. Accordingly, to determine how much time communication device 102 is expected to operate, the received battery charge level of communication device 102 may be multiplied by the corresponding power management efficiency factor. The resulting product is the expected operational time of communication device 102. A person of ordinary skill in the art would appreciate that a determination of an expected operational time depends on how the battery charge level of the subject communication device and the power management efficiency factor are measured.

At step 435 network element 126 determines if the expected operational time of communication device 102 meets a pre-determined criteria. In the present embodiment, the criteria comprises a time which may be set by the user or by the network operator. When the expected operation time meets the pre-determined criteria (i.e., the expected operational time is more than the pre-determined time), process 300 ends. When the expected operation time does not meet the pre-determined criteria (i.e., the expected operational time is less than the pre-determined time), network element 126 sends a message to communication device 102 indicating that the current battery charge level is low (step 440).

In the present embodiment, a network element within a communication system serving a communication device receives battery charge level information and the current mode of operation from the communication device. When the network element cannot access enough data points to determine a power management efficiency for the communication device, the network element retrieves an estimate from a database. Otherwise, when the network element can access enough data points to determine a power management efficiency, the network element determines it. Based on the power management efficiency of the communication device associated with the received mode of operation and a pre-determined criterion, the network element determines whether the current battery charge level of the communication device is too low to operate for a pre-determined period of time. The present embodiment allows the communication system to support subscribing communication devices by providing timely and accurate power management notifications.

Furthermore, the present embodiment may inform subscribers the power efficiency of particular software applications. The subscriber may use such information to determine whether to execute the application or, when provided to subscribers before the subscriber purchases or downloads the application, whether to purchase/download the application at all.

Figure 5:
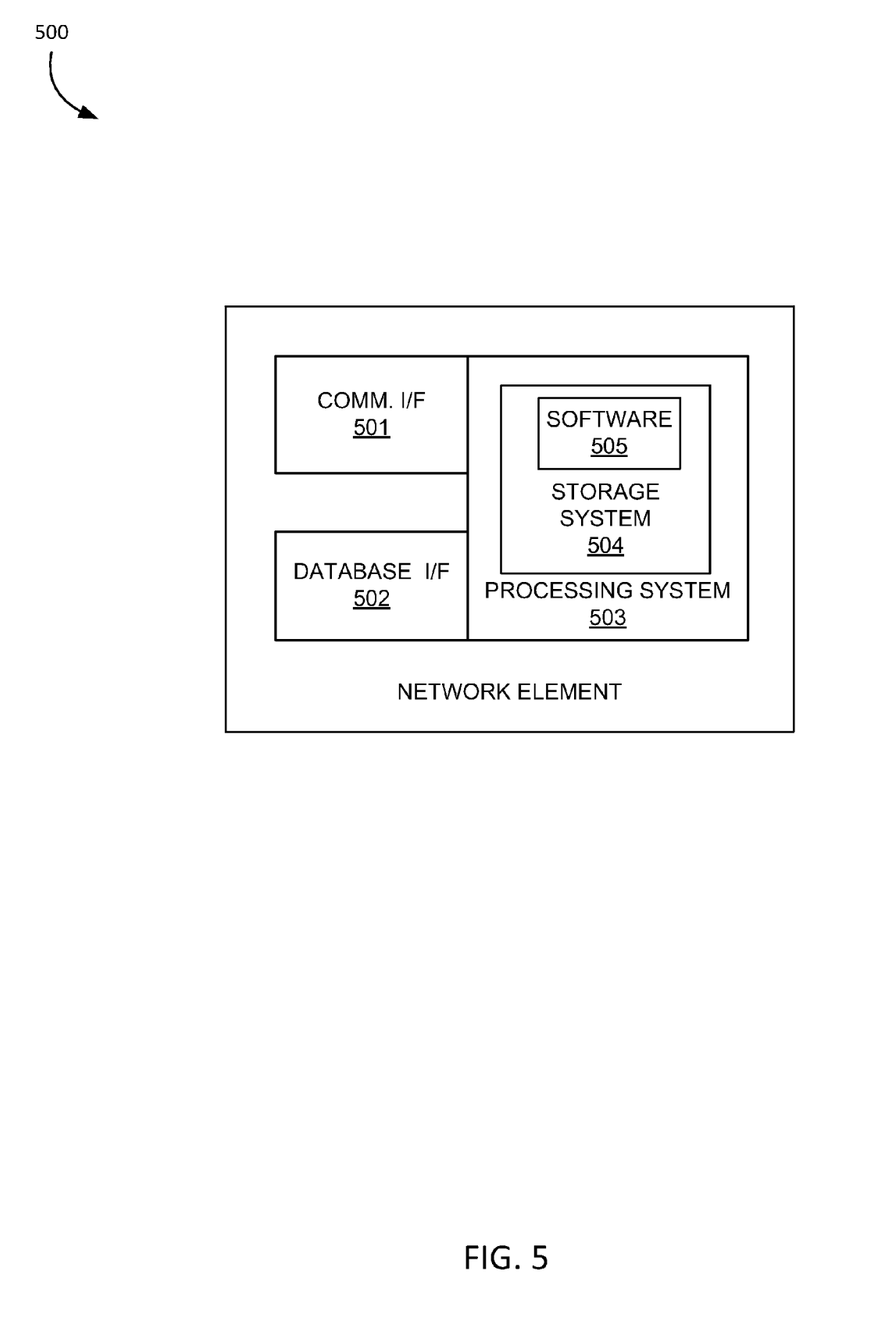
FIG. 5 includes a network element of an exemplary embodiment of the present teachings.

FIG. 5 illustrates a network element 500 according to the present teachings. Network element 500 is an example of network element 126 of FIG. 1, and thus, is comprised in a communication system such as communication system 106 described above with respect to FIG. 1. Network element 500 includes a communication interface 501 to communicate with one or more elements of the communication system, such as access nodes 120-122 of FIG. 1 through internal network 124 of FIG. 1. Through access nodes 120-122, network element 500 may communicate with communication devices served by communication system 106, such as communication devices 102 and 104. Network element 500 further includes database interface 502 to communicate with one or more databases, such as battery charge database 130 and power management database 132 of FIG. 1.

Network element 500 further includes processing system 503, which is linked to communication interface 501 and database interface 502. Processing system 503 includes processing circuitry for executing software 505 and storage system 504 to stores software 505. Network element 500 may further include other well-known components such as a power management unit, a control interface unit, etc., that are not shown for clarity.

Processing system 503 may include a microprocessor and other circuitry that retrieves and executes software 505 from storage system 504. Storage system 504 may include a disk drive, flash drive, data storage circuitry, or some other memory apparatus. Processing system 503 is typically mounted on a circuit board that may also hold storage system 504 and portions of communication interface 501 and network interface 502. Software 505 may include computer programs, firmware, or some other form of machine-readable processing instructions. Software 505 may also include an operating system, utilities, drivers, network interfaces, applications, or some other type of software. When executed by processing system 503, software 505 directs processing system 503 to operate network element 500 as described herein for network element 126.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description of exemplary embodiments and accompanying drawings are explanatory only, with a true scope and spirit of the present teachings being indicated by the following claims.

What is claimed is:

1. A method to manage a wireless communication device comprising:
    receiving, by a network element of a wireless communication system, a first message comprising a first battery charge level of the wireless communication device and a first time associated with the first battery charge level;
    storing, by the network element, a first database entry comprising information comprised in the first message, in a battery charge database;

retrieving, by the network element, a power management efficiency factor of the wireless communication device from a power management database;

determining, by the network element, an expected operational time of the wireless communication device based on the first message and the power management efficiency factor; and transmitting from the network element to the wireless communication device over the wireless communication system a message comprising an indication that the battery charge level is low when the determined operational time remaining meets an expected operational time criteria.

2. The method of claim 1, wherein the first message further comprises a first mode associated with the first battery charge level and the first time, and the first mode comprises one of device on, device idle, voice call, data call, device charging, executing a software application, and executing a specific software application.

3. The method of claim 2, wherein the power management efficiency factor is based on the wireless communication device and the first mode.

4. The method of claim 3, wherein the power management efficiency factor is further based on a battery of the wireless communication device.

5. The method of claim 2, wherein the power management efficiency factor is based on a type of wireless communication device and the first mode.

6. The method of claim 5, wherein the power management efficiency factor is further based on a type of battery of the wireless communication device.

7. The method of claim 2, wherein retrieving the power management efficiency factor comprises sending a request from the network element to the power management database for the power management efficiency factor comprising an identifier of the wireless communication device and the first mode.

8. The method of claim 2, wherein the expected operational time criteria is a time value configured by an operator of the wireless communication system.

9. The method of claim 2, wherein the expected operational time criteria is a time value configured by a user of the wireless communication device.

10. A network element of a wireless communication system comprising:

a communication interface to communicate with a wireless communication device subscribed to the wireless communication system;

a database interface to communicate with a power management database and a power management database;

a memory; and a processor coupled to the communication interface, the database interface, and the memory, configured to control the network element of the wireless communication system to:

receive a first message from the wireless communication device over the wireless communication system comprising a first battery charge level of the wireless communication device and a first time associated with the first battery charge level;

store a first database entry comprising information comprised in the first message, in the battery charge database;

retrieve a power management efficiency factor of the wireless communication device from the power management database;

determine an expected operational time of the wireless communication device based on the first message and the power management efficiency factor; and transmit a message to the wireless communication device over the wireless communication system, the message comprising an indication that the battery charge level is low when the determined operational time remaining meets an expected operational time criteria.

11. The element of claim 10, wherein the first message further comprises a first mode associated with the first time and the first battery charge level, and the first mode comprises one of device on, device idle, voice call, data call, device charging, executing a software application, and executing a specific software application.

12. The element of claim 11, wherein the power management efficiency factor is based on the wireless communication device, the first mode, and the battery of the wireless communication device.

13. The element of claim 11, wherein the power management efficiency factor is based on a type of wireless communication device, the first mode, and a type of battery of the wireless communication device.

14. The element of claim 11, wherein retrieving the power management efficiency factor comprises sending a request to the power management database for the power management efficiency factor comprising an identifier of the wireless communication device and the first mode.

* * * * *